Oct. 5, 1965 R. W. SILLETTI 3,209,796
COCKTAIL GLASS LIMER
Filed June 28, 1963 2 Sheets-Sheet 1
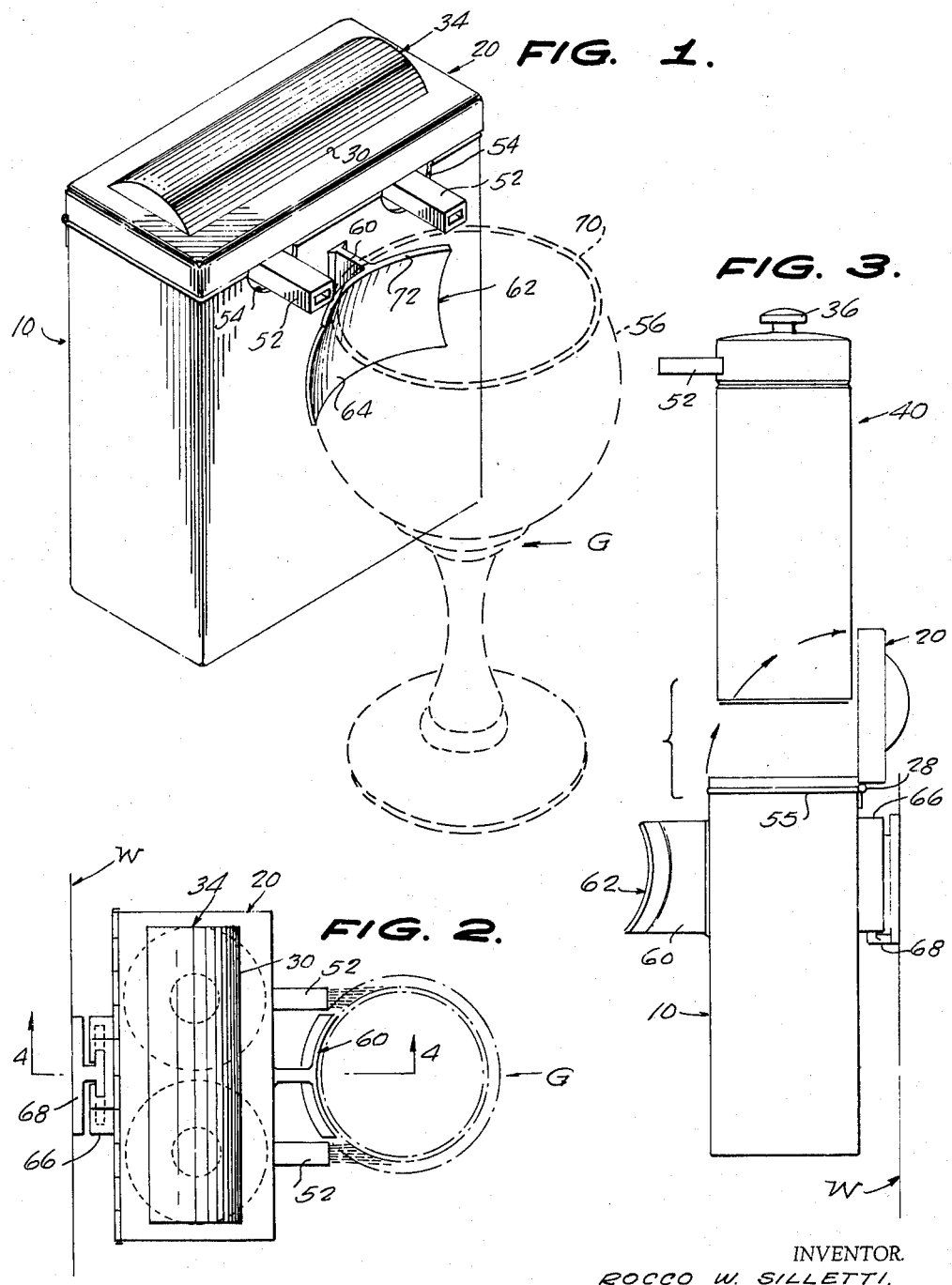
INVENTOR.
ROCCO W. SILLETTI,
BY
McMorrow, Berman & Davidson
ATTORNEYS.

Oct. 5, 1965  R. W. SILLETTI  3,209,796
COCKTAIL GLASS LIMER
Filed June 28, 1963  2 Sheets-Sheet 2

INVENTOR.
ROCCO W. SILLETTI,
BY
McMorrow, Berman & Davidson
ATTORNEYS.

United States Patent Office 3,209,796
Patented Oct. 5, 1965

3,209,796
COCKTAIL GLASS LIMER
Rocco William Silletti, 1821 E. Thurston, Spokane, Wash.
Filed June 28, 1963, Ser. No. 291,389
10 Claims. (Cl. 141—311)

This invention relates to a novel device for applying lime juice and sugar to the rims of cocktail glasses.

The primary object of the invention is the provision of a practical, efficient, and easily operated device of the kind indicated, which enables a bartender to accurately, quickly, and uniformly lime cocktail glasses in a fraction of the time and with substantially less labor than is required by the present manual methods of running a cut lime around the glasses and then dipping the edges of the glasses into powdered sugar while turning the same.

These present methods unavoidably involve getting too much lime juice and too much sugar on the glasses, and running of the mixture down the sides of the glasses, rendering the glasses difficult to handle and unsightly to customers. Hence, another object of the invention is the provision of a device of the character described which eliminates these undesirable consequences of the present methods.

A further object of the invention is the provision of a compact unitary device of the character indicated above, which is adapted to be rested upon a surface, such as a bar, or to be suspended from a wall or the like, which comprises a container for a pressure spray can of lime juice and a pressure spray can of powdered sugar, a depressible cover on the container for operating the valves of the cans, jets through which lime juice and sugar are discharged under pressure to a cocktail glass, and a combined shield and glass support, against which a glass is adapted to be rotated, and which serves to limit the depth of and render uniform the stripe of liming applied to the glass.

Other important objects and advantageous features of the invention will be apparent from the following description and the accompanying drawings, wherein, for purposes of illustration only, a specific form of the invention is set forth in detail.

In the drawings:

FIGURE 1 is a perspective view of a device of the present invention, showing, in phantom lines, a cocktail glass applied thereto;

FIGURE 2 is a top plan view of FIGURE 1, showing it mounted on a wall bracket;

FIGURE 3 is an exploded side elevation of FIGURE 2, showing the cover of the device in open position, and a pressure spray can withdrawn therefrom;

Figure 4:
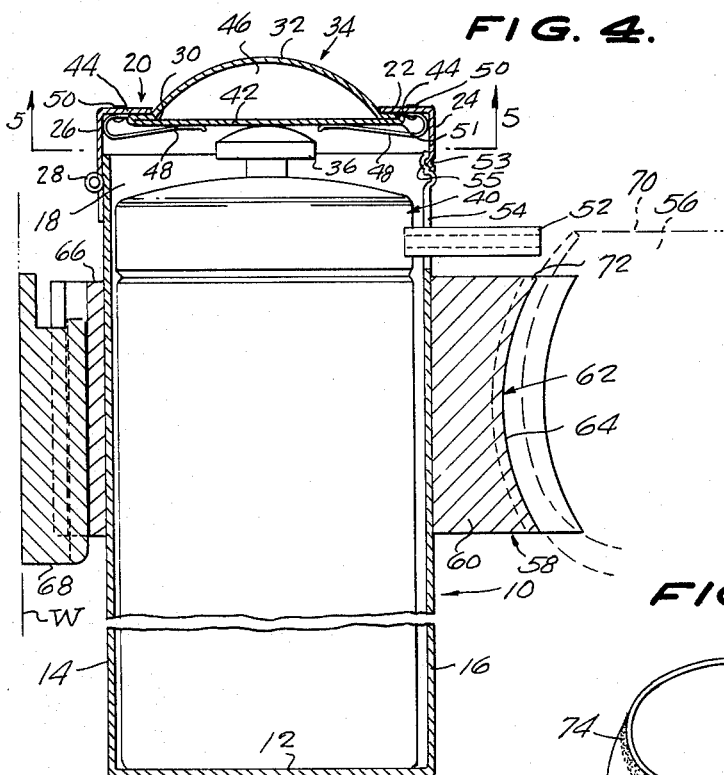
FIGURE 4 is an enlarged vertical transverse section taken on the line 4—4 of FIGURE 2.

Referring in detail to the drawings, wherein like numerals designate like parts throughout the several views, the illustrated device comprises a preferably vertically and longitudinally elongated rectangular container 10, having a bottom wall 12, a back wall 14, a front wall 16, and end walls 18.

A pan-shaped cover 20 is provided to close the upper end of the container 12, and has a top wall 22 and a pendent sidewall 24, which telescopes onto the top of the container, in the closed position of the cover, as shown in FIGURE 4. The back portion 26 of the cover sidewall is externally hinged, as indicated at 28, to the container back wall 14, at a point spaced downwardly from the upper edges thereof, whereby the cover top wall 22 is spaced above the upper edge of the container.

The cover top wall 22 is formed with a centered longitudinal rectangular opening 30, which passes the arcuate upwardly bowed upper portion 32 of a depressible spring operator 34 for the valves 36 of a pair of erect pressure spray cans 38 and 40, resting upon the container bottom wall 12. The operator 34 comprises a resilient sheet metal bottom wall 42, larger in area than the opening 30. Portions of the side edges of the bottom wall 42 are return bent onto the bottom wall 42, as indicated at 44, and merge into related edges of the upper portion 32. End walls 46 extend between the bottom wall 42 and the upper portion 32, at the ends thereof. Leaf springs 48, fixed, as indicated at 50, to the underside of the cover top wall 22, extend inwardly under the operator 34 and are biased upwardly against its bottom wall 42, whereby the operator is normally biased upwardly against the underside of the cover top wall 22. In this way, and as shown in FIGURE 4, the operator 34 normally is in a predetermined elevated position, wherein the depressible spray can valves 36 are in their elevated and closed positions.

In order to prevent the cover from being opened by the pressure of the springs 48, the front portions 51 of its sidewall 24, is provided with a horizontal longitudinal internal bead 53 which is adapted to snap into a similarly disposed external groove 55, formed in the container front wall 16, adjacent to the upper edge thereof.

The spray cans 38 and 40 have similar lateral nozzles or jets 52, which extend horizontally and forwardly therefrom, through notches 54 formed in the upper edge of the front wall 16 of the container 10. The nozzles 52 are in parallel relationship, and are spaced at a substantial distance from each other, and are equally spaced from the ends of the container, as shown in FIGURES 1 and 2, so that sprays issuing from the nozzles will strike the rim area of the side wall 56 of a cocktail glass G, separately and at substantially spaced points therearound.

A combined shield and glass support 58 comprises a vertical perpendicular web 60 fixed to the container front wall 16 midway between and just below the spray can nozzles, and has fixed, on its forward edge, a horizontal arcuate shield plate 62. The plate 62 is of concavo-convex cross section, the convex side 64 thereof being shaped to conformably engage the belly of the convex sidewall 56 of a glass G.

The device can be rested upon a suitable surface, such as a bar, held in the hand, or mounted on a vertical support, such as a wall W. For wall mounting, the container back wall 14 is provided, adjacent to its upper end, with a female bracket 66, which is adapted to be engaged over a male bracket 68, fixed to the wall W.

Figure 6:
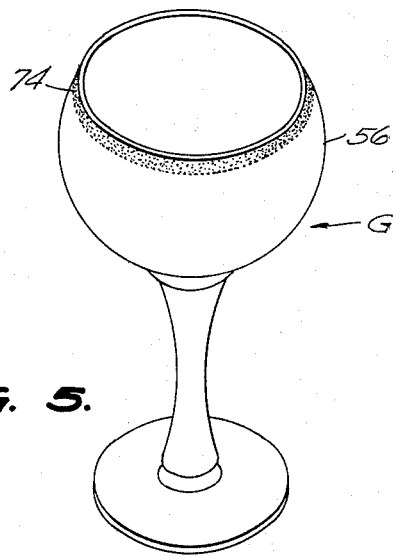
FIGURE 6 is a perspective view of a cocktail glass having a stripe of liming as applied by the device.
Figure 5:
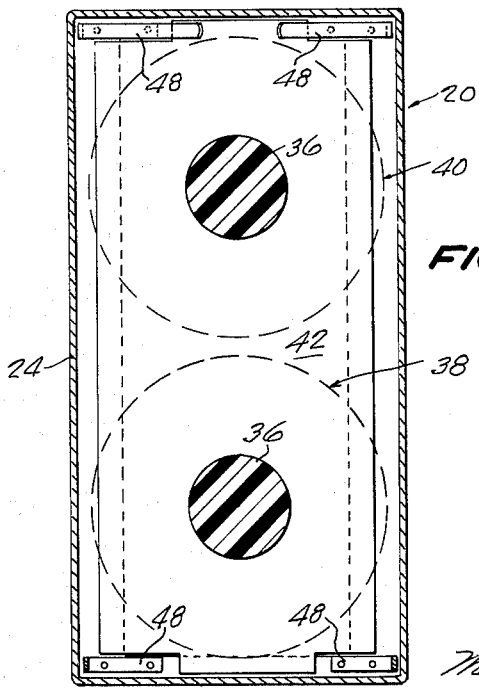
FIGURE 5 is a horizontal section taken on the line 5—5 of FIGURE 4.

In use and operation, while the device is held stationary, the sidewall 56 of a glass G is applied to the plate 42, as shown in FIGURE 1. This automatically positions the glass G so that a uniform width of its rim or edge area 70 of its side wall 56 is exposed above the horizontal upper edge 72 of the shield plate 62, which portion 70 is registered with the spray can nozzles 52. The glass G is then slowly rotated manually and the operator 34 is depressed, against the resistance of the springs 48, so that the spray can valves 36 are depressed to their open positions. This sprays lime juice and powdered sugar simultaneously onto the area 70 of the glass, as the glass is rotated, so that a sugar and lime strip 74 of uniform density and width is produced on the glass, as shown in FIGURE 6.

Either or both of the spray cans 38 and 40 can be quickly and easily replaced, when empty, simply by opening the cover 20.

Although there has been shown and described a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A cocktail glass limer comprising a support, a pair of laterally adjacent pressure spray can means on the support, said can means having valve means depressible to open positions and lateral nozzle means through which the contents of the can means is adapted to spray onto the sidewall of a glass, operating means movably mounted on the support and engageable with the can valve means for depressing and opening the same, and lateral combined shield and glass sidewall support means fixed on the support in the region of said nozzle means, said support means having an arcuate concave surface shaped to conform to the belly of the sidewall of a cocktail glass as the glass is rotated relative thereto.

2. A cocktail glass limer comprising a support, a pair of laterally adjacent pressure spray can means on the support, said can means having valve means depressible to open positions and lateral nozzle means through which the contents of the can means is adapted to spray onto the sidewall of a glass, operating means movably mounted on the support and engageable with the can valve means for depressing and opening the same, and lateral combined shield and glass sidewall support means fixed on the support in the region of said nozzle means, said support means having an arcuate concave surface shaped to conform to the belly of the sidewall of a cocktail glass as the glass is rotated relative thereto, said combined means having a horizontal upper edge spaced below the nozzle means for limiting the width of a stripe of liming applied by the nozzle means to the rim area of a cocktail glass above said upper edge.

3. A cocktail glass limer comprising a container having a bottom wall, a back wall, a front wall, and end walls, said walls having upper edges, a cover hinged on said back wall for closing the top of the container, said cover having an opening, a spring-elevated operator secured to the underside of the cover and exposed through said opening, spray can means disposed within the container and resting upon the bottom wall between said end walls, said can means containing lime juice and powdered sugar, said can means having laterally extending spray nozzle means, the upper edge of the front wall being formed with notch means through which the nozzle means extend, upstanding valve means on the can means contacting said operator, and a combined shield and glass support means on and extending laterally from the container front wall positioned below the spray nozzle means, said combined means having a horizontal arcuate concave surface conforming in contour to and adapted to be rotatably engaged by the belly of the sidewall of a cocktail glass, the upper edge of said concave surface being horizontal and adapted to be on a level below the upper edge of the sidewall of a glass engaged with said concave surface, the operator being adapted to be manually depressed to open the can valves and spray the rim area of the sidewall of the glass above the upper edge of the concave surface.

4. A cocktail glass limer comprising a container having a bottom wall, a back wall, a front wall, and end walls, said walls having upper edges, a cover hinged on said back wall for closing the top of the container, said cover having an opening, a spring-elevated operator secured to the underside of the cover and exposed through said opening, spray can means disposed within the container and resting upon the bottom wall between said end walls, said can means containing lime juice and powdered sugar, said can means having laterally extending spray nozzle means, the upper edge of the front wall being formed with notch means through which the nozzle means extend, upstanding valve means on the can means contacting said operator, and a combined shield and glass support means on and extending laterally from the container front wall positioned below the spray nozzle means, said combined means having a horizontal arcuate concave surface conforming in contour to and adapted to be rotatably engaged by the belly of the sidewall of a cocktail glass, the upper edge of said concave surface being horizontal and adapted to be on a level below the upper edge of the sidewall of a glass engaged with said concave surface, the operator being adapted to be manually depressed to open the can valves and spray the rim area of the sidewall of the glass above the upper edge of the concave surface, said combined means comprising a vertical web fixed to and extending laterally from the container front wall, and a horizontal arcuate plate on the forward edge of the web, said plate having its ends close to the nozzle means, said concave surface being formed in the forward side of the plate.

5. A cocktail glass limer comprising a container having a bottom wall, a back wall, a front wall, and end walls, said walls having upper edges, a cover hinged on said back wall for closing the top of the container, said cover having an opening, a spring-elevated operator secured to the under side of the cover and exposed through said opening, spray can means disposed within the container and resting upon the bottom wall between said end walls, said can means containing lime juice and powdered sugar, said can means having laterally extending spray nozzle means, the upper edge of the front wall being formed with notch means through which the nozzle means extend, upstanding valve means on the can means contacting said operator, and a combined shield and glass support means on and extending laterally from the container front wall positioned below the spray nozzle means, said combined means having a horizontal arcuate concave surface conforming in contour to and adapted to be rotatably engaged by the belly of the sidewall of a cocktail glass, the upper edge of said concave surface being horizontal and adapted to be on a level below the upper edge of the sidewall of a glass engaged with said concave surface, the operator being adapted to be manually depressed to open the can valves and spray the rim area of the sidewall of the glass above the upper edge of the concave surface, said operator comprising a resilient horizontal bottom wall larger in area than the cover opening and engaged with the underside of the cover, said operator having a convex upper portion fixed to the bottom wall of the operator and exposed through the cover opening, and springs fixed to the underside of the cover and upwardly biased against the underside of the bottom wall of the operator.

6. A cocktail glass limer comprising a container having a bottom wall, a back wall, a front wall, and end walls, said walls having upper edges, a cover hinged on said back wall for closing the top of the container, said cover having an opening, a spring-elevated operator secured to the under side of the cover and exposed through said opening, spray can means disposed within the container and resting upon the bottom wall between said end walls, said can means containing lime juice and powdered sugar, said can means having laterally extending spray nozzle means, the upper edge of the front wall being formed with notch means through which the nozzle means extend, upstanding valve means on the can means contacting said operator, and a combined shield and glass support means on and extending laterally from the container front wall posoitioned below the spray nozzle means, said combined means having a horizontal arcuate concave surface conforming in contour to and adapted to be rotatably engaged by the belly of the sidewall of a cocktail glass, the upper edge of said concave surface being horizontal and adapted to be on a level below the upper edge of the sidewall of a glass engaged with said concave surface, the operator being adapted to be manually depressed to open the can valves and spray the rim area of the sidewall of the glass above the upper edge of the concave surface, said cover having a top wall and a pendant side wall, said sidewall being adapted to telescope over the upper end of the container, and releasable retaining means acting between the cover sidewall and walls of the container for holding the cover in closed position.

7. A cocktail glass limer comprising a container having a bottom wall, a back wall, a front wall, and end walls, said walls having upper edges, a cover hinged on said back wall for closing the top of the container, said cover having an opening, a spring-elevated operator secured to the underside of the cover and exposed through said opening, spray can means disposed within the container and resting upon the bottom wall between said end walls, said can means containing lime juice and powdered sugar, said can means having laterally extending spray nozzle means the upper edge of the front wall being formed with notch means through which the nozzle means extend, upstanding valve means on the can means contacting said operator, and a combined shield and glass support means on and extending laterally from the container front wall positioned below the spray nozzle means, said combined means having a horizontal arcuate concave surface conforming in contour to and adapted to be rotatably engaged by the belly of the sidewall of a cocktail glass, the upper edge of said concave surface being horizontal and adapted to be on a level below the upper edge of the sidewall of a glass engaged with said concave surface, the operator being adapted to be manually depressed to open the can valves and spray the rim area of the sidewall of the glass above the upper edge of the concave surface, said operator comprising a resilient horizontal bottom wall larger in area than the cover opening and engaged with the underside of the cover, said operator having a convex upper portion fixed to the bottom wall of the operator and exposed through the cover opening, and springs fixed to the underside of the cover and upwardly biased against the underside of the bottom wall of the operator, and releasable retaining means acting between the cover and walls of the container for holding the cover in closed position.

8. A cocktail glass limer comprising a support, spray can means carried by the support, said can means having lateral nozzle means extending laterally from the support, combined shield and glass support mounted on the support beneath the nozzle means, said combined support having a concave arcuate support plate against which the side of a glass is adapted to be held and rotated relative to the nozzle means, the concavity of said plate being designed to conformably receive the belly of the sidewall of a cocktail glass, said plate having an edge spaced below said nozzle means and spaced below the upper edge of a glass engaged with the concavity of the plate, said can means having valve means, and operating means mounted on the support for operating the valve means.

9. A cocktail glass limer according to claim 8, wherein said spray can means comprises a pair of laterally adjacent spray cans, said nozzle means comprises laterally spaced nozzles, one to each spray can, said cans being adapted to contain different components of liming mixture, said arcuate support plate being located midway between the nozzles.

10. A cocktail glass limer according to claim 8, wherein said nozzle means comprises a pair of laterally spaced nozzles, said arcuate support plate being positioned midway between the nozzles.

References Cited by the Examiner
UNITED STATES PATENTS

| | | | |
|---|---|---|---|
| 2,088,542 | 7/37 | Westin | 118—320 X |
| 2,110,755 | 3/38 | Bleakley | 118—314 X |
| 2,582,671 | 1/52 | Blankenbiller | 141—369 |
| 2,674,223 | 4/54 | King | 118—16 |
| 3,032,081 | 5/62 | La Cotta | 141—362 |

LAVERNE D. GEIGER, *Primary Examiner.*